UNITED STATES PATENT OFFICE.

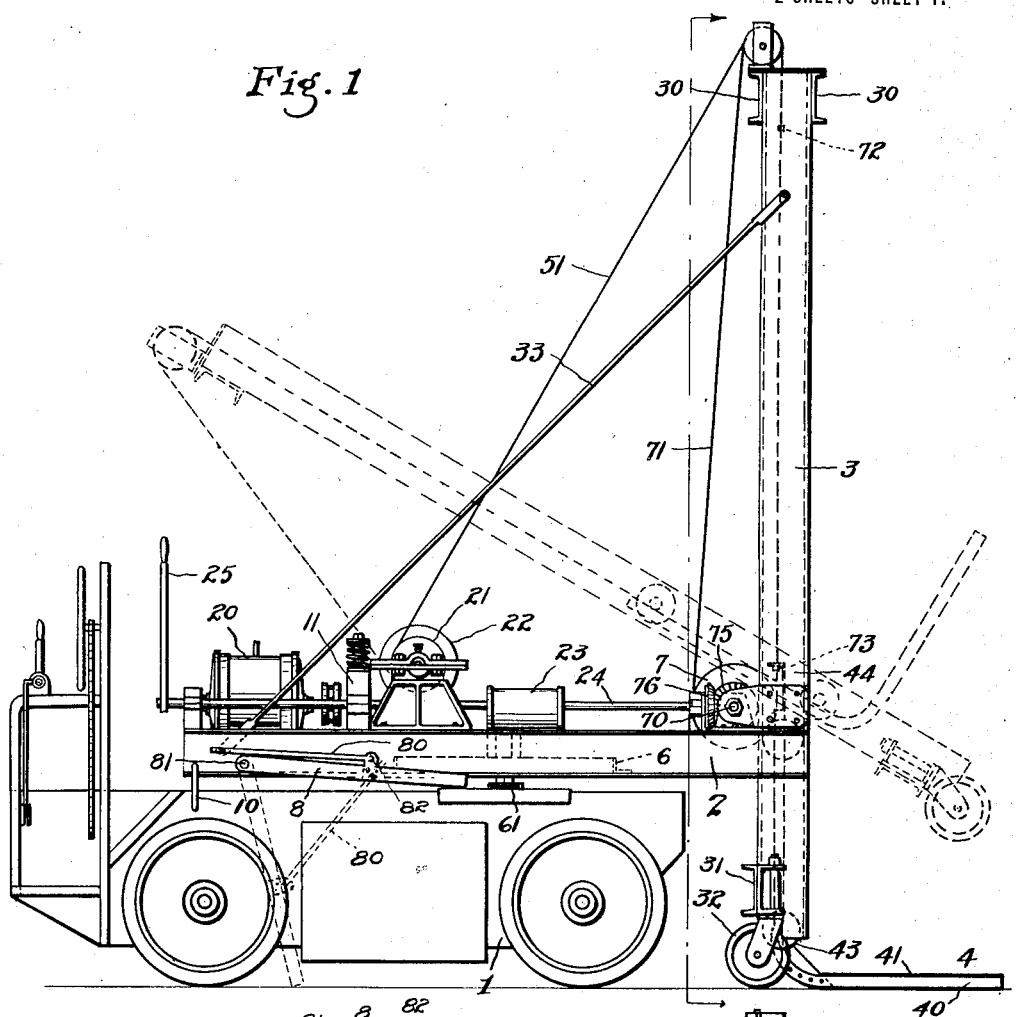
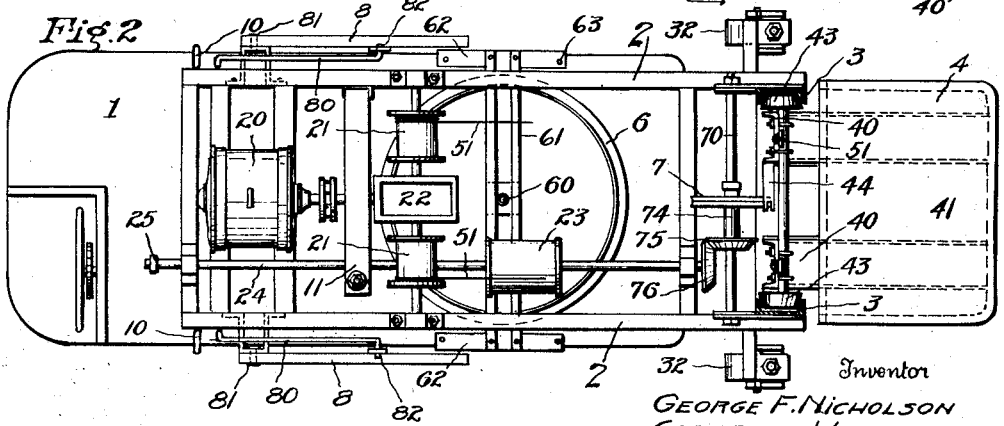

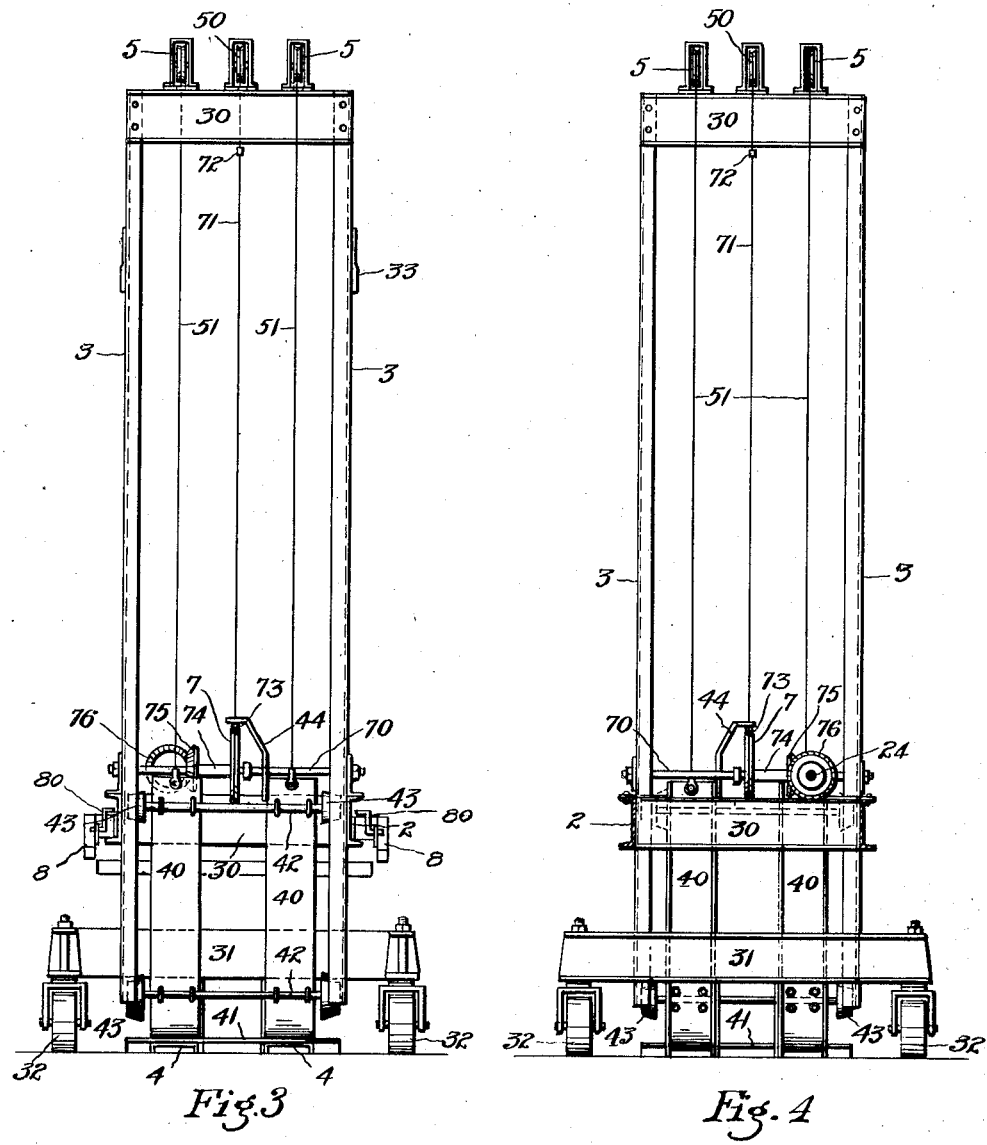

GEORGE F. NICHOLSON AND GODTFRED WHITESTONE, OF SEATTLE, WASHINGTON.

PORTABLE FREIGHT-STACKING ELEVATOR.

1,340,458.   Specification of Letters Patent.   Patented May 18, 1920.

Application filed May 24, 1919. Serial No. 299,391.

*To all whom it may concern:*

Be it known that we, GEORGE F. NICHOLSON and GODTFRED WHITESTONE, citizens of the United States, and residents of Seattle, King county, Washington, have invented certain new and useful Improvements in Portable Freight-Stacking Elevators, of which the following is a specification.

Our invention relates to elevators or stackers which are portable and are intended for handling freight and goods, and particularly where they are to be piled upon each other so as to form more than one layer.

The object of our invention is to provide a convenient and effective device which may be moved about as desired so that it may be employed for raising and lowering freight for the purpose of stacking the same, or for removing it from the pile, and one which is capable of being used in any part of an ordinary warehouse.

Another of the objects of our invention is to provide a device capable of doing this work, which may be mounted upon a suitable car or transporting mechanism, and which may also be employed in connection with self-operating cars, such for instance as the electrically driven trucks which are employed in warehouse and wharf work.

The particular and definite further objects of our invention will be disclosed by a study of the specification and drawings, and the features which we deem to be novel and upon which we desire patent protection will be defined by the claims terminating this specification.

In the accompanying drawings we have shown our invention as it is now constructed by us.

Figure 1 is a side elevation of our device shown as mounted upon an electrically driven truck.

Fig. 2 is a plan view of the same device, excepting that the hoist ways are shown in section.

Fig. 3 is an outer end view, and Fig. 4 an inner or back view of the hoist ways and the freight receiving and hoisting platform which is mounted to operate thereon.

Our device is herein shown as supported upon and operated in conjunction with an electrically driven truck 1. While a truck of this sort is a very effective and convenient means in connection with which to operate our invention, it is not to be understood that its use is limited to such a truck. On the contrary, our novel parts may be mounted upon an ordinary truck, or may be provided with additional supporting wheels so as to be wholly independent of anything in the nature of a separate truck. We have, however, shown it as mounted upon a truck of this kind and will so describe it, it being clearly understood that the invention is not limited to use in connection with such a truck.

A horizontal base frame 2 is provided, upon which the other parts are mounted. This frame should preferably be provided with a hoist operating plant, such plant as herein shown consist of an electric motor 20, hoisting drums 21, and suitable means for controlling and operating these parts so as to raise and lower the desired loads. Other types and varieties of power plants which are found suitable may be substituted for that shown.

The manner of connecting the electric motor 20 with the hoisting drums 21 may be varied as desired and found most suitable. In the construction illustrated this is supposed to be secured through the use of a worm drive which is contained within the case 22. The electric controller by which the operation of the motor is controlled is contained within a casing 23, and this is operated through a shaft 24 and a lever arm 25 which is secured to the shaft. These parts may be of any standard construction.

One end of the main or base frame 2, overhangs the end of the supporting truck 1. To this end of the base frame are connected the two hoist ways or guide ways 3, by which the freight receiving and hoisting platform 4 is guided while being raised or lowered. These hoist ways are cross-connected in a suitable manner, as by beams 30 and 31. The latter beam, which is at the bottom of the hoist ways, is shown as extending beyond its outer side surfaces and as having caster wheels 32 carried by their lower ends and adapted to rest upon and to travel over the floor. Such, or equivalent means, should be provided whereby the lower ends of these hoist ways may be supported from the floor thereby relieving the base frame 2 and the truck 1 as much as possible from the weight of the goods being hoisted.

The hoist ways 3 are herein shown as composed of channel bars having their flanges at the inner side, or facing the opposite hoist ways. The freight receiving platform 4, in the construction illustrated, also consists of two channel beams 40, which are bent into the form of a letter L or to form two end sections at right angles to each other and connected by comparatively short bends. The two channel beams 40 are covered by a plate 41 of rolled steel and is thus capable of being brought very close to the floor, and thus it will not be necessary to lift a load any distance in order to get it upon this platform.

To the upwardly extending arms of the channel beams 40 are secured two shafts 42 upon the ends of which are journaled wheels 43, which are of such a size as to fit with as much snugness as is feasible between the flanges of the channel bars 3 forming the hoist ways, without, at the same time binding. This platform is thus supported in proper position while being raised and lowered.

The cross beams 30 which are at the upper end of the hoist ways 3, have carried thereon pulleys 5, over which pass hoist ropes 51, which ropes are connected to the upper ends of the beams 40 of the freight receiving and hoisting platform. These ropes 51 extend to, and are secured upon the drums 21. As herein shown, two drums and two hoisting ropes are used, this number may be varied as desired or found necessary.

The base frame 2 has a turntable construction between itself and the supporting car 1. We have shown, a track way ring 6, as forming a part of this turntable, and a king pin 60 is also employed in connection therewith, this pin being carried by transverse bars 61. The outer ends of the transverse bars 61 have secured thereto short sections 62 of angle bar, these being spaced apart such a distance that they fit snugly over the edges of the top of the supporting car 1. They may be more thoroughly secured in place by the use of bolts as 63.

By reason of this turntable support the base frame 2 may be swung around at any angle, so that the freight receiving and hoisting platform may be placed at the end or at the side of the car, or at an angle with its length. To hold the rear end of the base frame 2 securely, links or bars as 10 may be employed. The actual weight of the hoisting is carried mainly by the small wheels or casters 32, which are mounted upon the lower ends of the hoist ways 3.

The hoist ways 3 are pivotally mounted upon the base frame 2, so that they may be swung backward and over this base frame, after the manner which has been indicated by dotted lines in Fig. 1. This enables the machine to be taken through doors and beneath low beams, while at the same time making it possible to get a satisfactory range in the lift at other times. The hoist ways are supported in raised position by means of rods 33, which connect the upper part of the hoist ways with the rear end of the base frame 2. These may be easily disconnected when it is desired to lower the hoist ways.

Mounted upon the shaft 70, upon which the hoist ways 3 are pivoted, is a wheel or sheave 7. This is free to turn upon the shaft 70 and has secured thereto a rope 71, which also passes over a sheave 50 carried at the upper end of the hoist ways. Upon a run of this rope, which is parallel with the hoist ways, are mounted two stop buttons 72 and 73. These are employed as stops to limit the movement of the freight hoisting platform. Coöperating with these is an arm 44, which is carried by the upper end of the freight hoisting platform. This arm 44 has a slot or notch cut in its upper end and this embraces the rope 71; or any convenient means may be used whereby the freight receiving platform in its vertical movement will engage these buttons.

The sheave 7 is connected by means of a sleeve 74, with a beveled gear 75, and this gear is connected with another beveled gear 76, which is carried by an extension of the shaft 24, through which the electric controller is operated. Therefore, when the arm 44 or other member carried by the freight receiving and hoisting platform contacts with one of the buttons 72 and 73, it automatically acts to shift the electric controller, thus to stop the machine and to draw the same into position for later hand actuation. At the same time it automatically applies the brake 11.

The electricity for operating this mechanism may be obtained from batteries carried by the car 1, or by connection through a cable with some other source of supply. The manner of securing the power for the apparatus, and in fact the kind of power employed, so that it is convenient and effective, is immaterial. The type of power plant which has been shown and described is, however, that which is preferred by us as being most convenient and effective.

In using this device the platform 4 is lowered into contact with the floor. The bales or other goods to be stacked are dumped upon this platform and then raised to the height desired. The platform 4 may be projected over the pile by advancing the car 1. Also after a bale or other package has been deposited in place, whether this be upon the floor or in an upper tier of the stack, the platform 4, after having been withdrawn, may be raised slightly and used as a ram for pushing the bale or box into position. This is due to the fact that it is mounted upon a car which is readily movable.

For convenience in removing our hoisting device from a tractor or truck, such as is shown, and also for supporting it during periods of non-use, or at any other time, we have provided legs 8 which are pivoted to the frame 2 at the end which is distant from the hoist ways, as at 81. When mounted upon a tractor or truck, these legs may be swung up so as to clear the floor. These might conveniently be supported by the platform of the tractor, as shown.

A brace rod 80, pivoted to the leg, is adapted to be secured to the frame 2, as at 82, so that the leg when in use will be securely held in position. These legs would be made of such a length that when in vertical position they would raise the frame 2 just enough to clear the tractor or truck platform. To raise it off the truck or tractor it is only necessary to lower the legs and run the car forward until the legs are straight and then secure the brace rods 80. By then removing the king pin 60, the tractor is free from the hoist, and may be used for some other purpose.

What we claim as our invention is:

1. A freight stacking elevator comprising a frame adapted to be detachably secured to a portable base, hoistways carried by one end of this base and extending both above and below said frame and carrying supporting members engaging the floor, means for raising said hoistways to clear them from the floor, a freight receiving platform movable on said guideways, and means carried by said frame for operating said platform.

2. A device as in claim 1 having casters upon the lower ends of the hoist ways and engaging the floor.

3. A device as in claim 1 having the hoist ways hinged to swing down over the main frame and also having floor engaging wheels carried by the lower ends of said hoist ways.

4. A portable freight elevator for warehouse use comprising a portable supporting base, a frame carried upon the base and having an overhanging end, hoistways pivoted to the overhanging end of said frame to swing back over the platform, a freight receiving platform having guided engagement with said hoistways, and means carried by said frame for hoisting and lowering said freight receiving platform.

5. A freight stacking elevator comprising a base frame, a turntable carried by and beneath said base frame, the base part of said turntable having angle plates adapted to engage the side edges of a supporting car body, means for securing the back end of the base frame to the supporting car body and a hoisting mechanism carried by the other end of said frame and extending from the floor upwardly.

6. A portable warehouse elevator comprising a frame having hoistways at one end, means for portably supporting said frame, wheels carried by the lower ends of said hoistways and adapted to bear upon the floor, a freight receiving platform having guided engagement with said hoistways, and hoist operating means carried by said frame.

7. A freight hoisting elevator having a base frame, a hoistway pivoted to swing back upon the base frame, a hoist movable on the hoistway, hoist operating means carried on the base frame, an automatic stop for the hoist operating means comprising a line having stop buttons thereon and an arm carried by the hoist and adapted to engage said buttons, a wheel journaled co-axially with the pivot of the hoist way and to which said line is secured, and means operative by said wheel to stop the hoist operating means.

8. A portable freight elevator and stacker comprising a frame adapted to be carried upon a truck, hoistways carried by said frame, supports for said hoistways from the floor, and legs hinged to the frame and adapted to support one end of the frame when the truck is removed.

9. A freight elevator and stacker comprising a frame adapted to be carried upon a truck with one end overhanging, hoistways carried by the overhanging end of the frame, wheels carried by the lower ends of the hoistways and engaging the floor, and legs hinged to and adapted to support the other end of the frame above its carrying car, and means for raising said legs when desired.

10. A freight elevator and stacker comprising a frame adapted to be carried upon a truck with one end overhanging, hoistways carried by the overhanging end of the frame, wheels carried by the lower ends of the hoistways and engaging the floor, legs pivoted to the other end of the frame and brace rods adapted to connect the legs with the frame, one end of said brace rods being detachably supported.

Signed at Seattle, Washington, this 16th day of May, 1919.

GEORGE F. NICHOLSON.
GODTFRED WHITESTONE.